(12) United States Patent
Ono

(10) Patent No.: US 9,387,974 B2
(45) Date of Patent: Jul. 12, 2016

(54) SINGLE DOSE PACKAGE

(75) Inventor: Saichi Ono, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 589 days.

(21) Appl. No.: 13/701,381

(22) PCT Filed: Jun. 3, 2011

(86) PCT No.: PCT/JP2011/062801
§ 371 (c)(1),
(2), (4) Date: Nov. 30, 2012

(87) PCT Pub. No.: WO2011/152521
PCT Pub. Date: Dec. 8, 2011

(65) Prior Publication Data
US 2013/0075299 A1 Mar. 28, 2013

(30) Foreign Application Priority Data
Jun. 3, 2010 (JP) .................. 2010-127839

(51) Int. Cl.
*B29D 22/00* (2006.01)
*B29D 23/00* (2006.01)
(Continued)

(52) U.S. Cl.
CPC .............. *B65D 83/06* (2013.01); *B32B 15/085* (2013.01); *B32B 27/32* (2013.01); *B32B 27/36* (2013.01); *B65B 1/00* (2013.01); *A61J 1/10* (2013.01); *B32B 2439/00* (2013.01); *Y10T 428/1334* (2015.01); *Y10T 428/1352* (2015.01)

(58) Field of Classification Search
CPC .... B65D 83/06; B65D 1/00; Y10T 428/1334; Y10T 428/1352; A61J 1/10; B32B 15/085; B32B 27/32; B32B 27/36; B32B 2439/00
USPC .................. 206/530; 53/428; 428/35.2, 35.7
See application file for complete search history.

(56) References Cited

U.S. PATENT DOCUMENTS 4,681,764 A 7/1987 Endo et al.
5,686,081 A 11/1997 Ono et al.
(Continued)

FOREIGN PATENT DOCUMENTS

JP 2006-175729 A 7/2006
TW 280768 7/1996

OTHER PUBLICATIONS

Int. Search Rpt. Jun. 27, 2011, PCT/JP11/062801.

*Primary Examiner* — Michael C Miggins
(74) *Attorney, Agent, or Firm* — Birch, Stewart, Kolasch & Birch, LLP

(57) ABSTRACT

The object of the present invention is to provide an single-dose package containing an internal adsorbent wherein the internal adsorbent is not trapped in the heat-sealed region thereof. In addition, the object of the present invention is to provide a single-dose package containing internal adsorbent wherein adhesion of the internal adsorbent around the vacuumed open region thereof is slight, whereby the internal adsorbent does not spill out on opening the package. The object of the present invention can be solved by a single-dose package characterized in that the internal adsorbent is tight-packed using a packaging material having a mean specific surface resistivity of from $4.4 \times 10^9 \Omega$ or more to $1.0 \times 10^{16} \Omega$ or less at its internal surface, under warming and/or reduced pressure.

8 Claims, 3 Drawing Sheets

| (51) | Int. Cl. | |
|---|---|---|
| | *B32B 1/08* | (2006.01) |
| | *B65D 83/06* | (2006.01) |
| | *B32B 15/085* | (2006.01) |
| | *B32B 27/32* | (2006.01) |
| | *B32B 27/36* | (2006.01) |
| | *B65B 1/00* | (2006.01) |
| | *A61J 1/10* | (2006.01) |

(56) References Cited

U.S. PATENT DOCUMENTS

| | | |
|---|---|---|
| 2003/0039852 A1 | 2/2003 | Okumura et al. |
| 2004/0141963 A1 | 7/2004 | Umekawa et al. |
| 2005/0013953 A1 | 1/2005 | Ono et al. |
| 2005/0079167 A1 | 4/2005 | Sonobe et al. |
| 2008/0044477 A1 | 2/2008 | Sonobe et al. |
| 2008/0081073 A1 | 4/2008 | Sonobe et al. |
| 2012/0244195 A1 | 9/2012 | Sonobe et al. | ns text...

SINGLE DOSE PACKAGE

CROSS-REFERENCES TO RELATED APPLICATIONS

The present application is a National Stage application under 35 U.S.C. §371, claiming priority to PCT/JP2011/062801, filed Jun. 3, 2011, which application claims the benefit of priority to Japanese Patent Application No. 2010-127839, filed Jun. 3, 2010; the teachings of both applications are incorporated herein by reference in their entirety for all purposes.

TECHNICAL FIELD

The present invention relates to a single-dose package, and more specifically, a single-dose package characterized in that an internal adsorbent is tight-packed using a packaging material having mean specific surface resistivity of $4.4 \times 10^9 \Omega$ to $1.0 \times 10^{16} \Omega$ at its internal surface, under warming. According to the present invention, a single-dose package wherein the internal adsorbent is not trapped in a heat-sealed region thereof, and the internal adsorbent hardly spills out on opening, can be provided.

BACKGROUND ART

An internal adsorbent can adsorb toxic substances taken into a body and harmful substances metabolized in a body, in the gastrointestinal tract, and can excrete them to the outside of the body. As an example of the internal adsorbent, an oral adsorbent which can be orally administered to cure a disorder of renal and liver functions has been developed and used effectively (Patent literature 1). This adsorbent for oral administration comprises a porous spherical carbonaceous substance having particular functional groups (i.e. a surface-modified spherical activated carbon); having a high degree of safety and stability in the body; and having a useful selective adsorbability, that is, an excellent adsorbability of harmful substances in the presence of bile acid in an intestine, and a low adsorbability of useful substances such as digestive enzymes in the intestine. For these reasons, the adsorbent for oral administration is widely and clinically used for patients suffering from disorders of the liver or renal function, as an adsorbent having few side effects such as constipation. The above adsorbent for oral administration disclosed in Patent literature 1 was prepared by forming a spherical activated carbon from a pitch such as a petroleum pitch as a carbon source, and then carrying out an oxidizing treatment and a reducing treatment. Recently, as described in Patent literature 2, an adsorbent for oral administration prepared from a thermosetting resin such as phenol resin as a carbon source has been developed. The adsorbent for oral administration disclosed in Patent literature 2 has excellent selective adsorbability compared to the adsorbent for oral administration disclosed in Patent literature 1. Further, it is important that an adsorbent for oral administration can adsorb as much of the toxic substances as possible during the retention period from the oral administration to excretion. According to descriptions of Patent literatures 3 and 4, the adsorbent for an oral administration comprising a spherical activated carbon having smaller average particle size can adsorb many toxins within the retention period from the oral administration to excretion.

It is known that the adsorbability of the internal adsorbent is reduced by adsorbing moisture in the atmosphere. In order to prevent the reduction of the adsorbability, it is necessary to store in a tight container. According to the definition in the Japanese Pharmacopoeia, a tight container means a container wherein an invasion of a liquid and solid contaminant or water can be protected in usual handling or usual state of conservation, and medicine therein can be protected from loss, efflorescence, deliquescence, or vaporescence. The tight container, for example, may be a tube, can, single-dose package, plastic container, or the like. As embodiments of package capable of tight-packing the internal adsorbent, there may be mentioned: can package, bottle package using cap with packing, single-dose package such as three sided-sealed package, four-sided sealed package, stick package, and the like. In particular, the single-dose package is a superior embodiment of package, as one dose of internal adsorbent to be administered can be packed.

The single-dose package containing an internal adsorbent may be prepared by tight-packing internal adsorbent into a composite film having a sealant layer on its inner surface. A packaging material with sealant layer which may be used for the single-dose package containing internal adsorbent is disclosed, for example, in Patent literature 5 by the present inventors. For example, the single-dose package containing an internal adsorbent is shown in FIG. 1. That is, a single-dose package containing an internal adsorbent having heat-sealed region and open region can be prepared by filling the internal adsorbent to a stick consisting of composite film, and sealing an upper portion of the stick by heat.

The internal adsorbent has a property of adsorbing and desorbing air, in addition to the essential property of adsorbing the toxic substances. Air adsorbed in the internal adsorbent can be desorbed or released therefrom by raising the temperature in the surrounding environment. Further, air adsorbed in the internal adsorbent can be desorbed or released therefrom by reducing the pressure in the surrounding environment. This property of the internal adsorbent is reversible. That is, air is adsorbed in the internal adsorbent by lowering the temperature or by increasing the pressure in the surrounding environment. Therefore, when a single-dose package, which is tight-packed at low temperature, is placed at high temperature, air adsorbed in the internal adsorbent is desorbed or released, and the volume of the single-dose package containing the internal adsorbent expands. Therefore, there is a high possibility that problems, such as a break in seal region, a break of the package, or a pinhole formation, will arise due to the volume expansion of the single-dose package. Further, problems in storage and delivery thereof may arise due to the volume expansion of the single-dose package. In order to avoid the above problems, a method for filling the internal adsorbent, wherein the internal adsorbent is filled at temperature of 5° C. higher than room temperature to 300° C., or under reduced pressure, is carried out. According to the above method, air contained in the internal adsorbent is released just before packaging. And then, when the temperature of the internal adsorbent drops after tight-packing the internal adsorbent into the packaging material of the single-dose package, air in the single-dose package is adsorbed by the internal adsorbent therein. As a result, the pressure in the single-dose package containing the internal adsorbent is reduced, and the single-dose package becomes a vacuum-pack shaping a flattened single-dose package. The volume of the single-dose package obtained by the above method does not expand, when the temperature therearound is high. This is because, little air is released from the internal adsorbent (Patent literature 6).

CITATION LIST

Patent Literature

[Patent literature 1] Japanese Examined Patent Publication (Kokoku) No. 62-11611
[Patent literature 2] WO2004/039381 (Japanese Patent No. 3835698)
[Patent literature 3] Japanese Unexamined Patent Publication (Kokai) No. 2005-314415 (Japanese Patent No. 3865399)
[Patent literature 4] Japanese Unexamined Patent Publication (Kokai) No. 2005-314416 (Japanese Patent No. 3865400)
[Patent literature 5] Japanese Unexamined Patent Publication (Kokai) No. 2005-7827
[Patent literature 6] Japanese Unexamined Patent Publication (Kokai) No. 6-190021 (Japanese application No. 5-246036; Japanese Patent No. 2607422)
[Patent literature 7] Japanese Unexamined Patent Publication (Kokai) No. 2004-244414

SUMMARY OF INVENTION

Technical Problem

In the single-dose package obtained by the above method, problems such as breaks in the seal region, breaks of the package, or pinhole formation do not arise, and thus the single-dose package is highly advantageous for storage and delivery. However, problems do sometimes occur, even in the single-dose package obtained by the above method. That is, the internal adsorbent comprising the spherical activated carbon is trapped in the heat-sealed region, and thus the heat-sealing is not adequate. Further, when the single-dose package is opened, the internal adsorbent may spill out due to attachment of the internal adsorbent around the inside of the open region. These problems occur in the single-dose packages containing the spherical activated carbon, but do not occur in a single-dose package containing usual powdered drugs. The present inventor has considered that the above problems in the single-dose package containing internal adsorbent correlates to the physical properties of the internal adsorbent, the physical properties of the packaging material, and the vacuumed condition of the single-dose package.

The object of the present invention is to provide a single-dose package containing internal adsorbent wherein the internal adsorbent is not trapped in the heat-sealed region thereof. In addition, the object of the present invention is to provide a single-dose package containing internal adsorbent wherein adhesion of the internal adsorbent is slight in the vacuumed open region thereof, whereby the internal adsorbent does not spill out on opening the package.

With the aim of solving the aforementioned problems, the present inventor have conducted intensive studies, and as a result, found that the above problems can be solved by tight-packing the internal adsorbent using a packaging material having a mean specific surface resistivity of $4.4 \times 10^9 \Omega$ or more to $1.0 \times 10^{16} \Omega$ or less at its internal surface. The solution of the problems is due to the mean specific surface resistivity in internal surface of the packaging material, and the surface electric charge property of the internal adsorbent. In particular, when the spherical activated carbon having 0.028 to 0.707 µC/g of the surface electric charge property is used as the internal adsorbent, a remarkable effect of the present invention can be obtained.

The present invention is based on the above findings.

Solution to Problem

Accordingly, the present invention relates a single-dose package characterized in that an internal adsorbent is tight-packed using a packaging material having a mean specific surface resistivity of $4.4 \times 10^9 \Omega$ or more to $1.0 \times 10^{16} \Omega$ or less at its internal surface, under warming and/or reduced pressure.

According to a preferable embodiment of the single-dose package of the present invention, the internal adsorbent is a spherical activated carbon having a surface electric charge property of 0.028 µC/g or more to 0.707 µC/g or less, which is the static charge amount of the spherical activated carbon when the spherical activated carbon contained in a fluorocarbon resin (perfluoroalkoxyalkane resin) container (hereinafter referred to as PFA container) is rotated at 120 rpm for 5 minutes.

According to a preferable embodiment of the single-dose package of the present invention, the internal adsorbent is an adsorbent for oral administration.

According to another preferable embodiment of the single-dose package of the present invention, the packaging material is a composite film comprising an outer layer, an intermediate layer, and an inner layer, and more preferably the intermediate layer comprises an aluminum layer.

According to a preferable embodiment of the single-dose package of the present invention, the packaging material is composed of, in order from outside to inside, an outer layer consisting of a polyethylene terephthalate layer and a polyethylene layer; an intermediate layer consisting of an aluminum layer; and an inner layer consisting of a polyethylene layer and a polyethylene layer containing antistatic agent.

According to another preferable embodiment of the single-dose package of the present invention, the shape of a single-dose package has a width of 1 cm or more to 6 cm or less, and a length of 6 cm or more to 15 cm or less.

Further, the present invention relates to a method for preparing a single-dose package characterized in that an internal adsorbent is tight-packed using a packaging material having a mean specific surface resistivity of $4.4 \times 10^9 \Omega$ or more to $1.0 \times 10^{16} \Omega$ or less at its internal surface, under warming condition and/or reduced pressure.

Advantageous Effects of Invention

According to the present invention, a single-dose package wherein the internal adsorbent is not trapped in the heat-sealed region thereof, and the internal adsorbent hardly spills out on opening, can be provided.

BRIEF DESCRIPTION OF THE DRAWINGS

FIG. 1(A) is a side view of the single-dose package just after sealing by heat, wherein the internal adsorbent is filled with therein and then the single-dose package is sealed by heat under warming. FIG. 1(B) is a side view of the single-dose package which is cooled to room temperature after sealing by heat. FIG. 1(C) is a front view of the single-dose package which is cooled to room temperature after sealing by heat.

DESCRIPTION OF EMBODIMENTS

Figure 1:
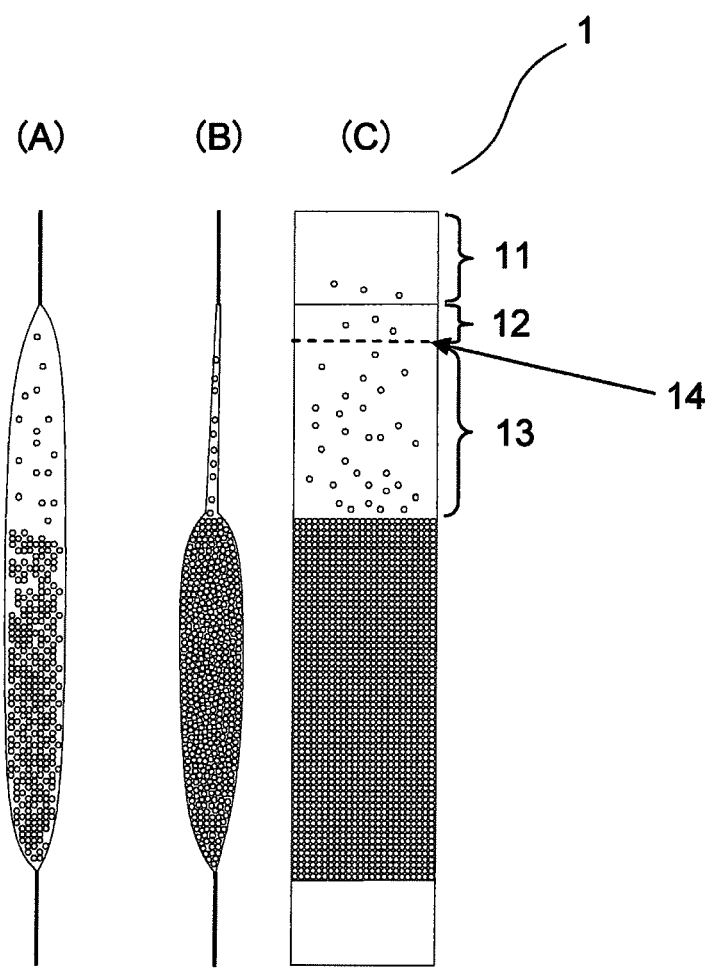
FIG. 1 is a view showing an embodiment of the single-dose package of the present invention.

The single-dose package of the present invention is tight-packed using a packaging material having a mean specific surface resistivity of $4.4 \times 10^9 \Omega$ or more to $1.0 \times 10^{16} \Omega$ or less at its internal surface, under warming and/or reduced pressure.

The internal adsorbent used in the single-dose individual package of the present invention is not particularly limited, as long as it can adsorb harmful substances in the body. However, an internal adsorbent comprising a spherical activated carbon having 0.028 to 0.707 μC/g of the surface electric charge property is preferable. The surface electric charge property of the internal adsorbent is more preferably 0.142 to 0.594 μC/g, most preferably 0.225 to 0.481 μC/g.

In the present specification, the "surface electric charge property" of the internal adsorbent is measured as follows.

About 0.1 g of internal adsorbent is put in 60 mL volume of a cylindrical PFA container with cap wherein aluminum tape is affixed to the entire outside of the container and cap under temperature of 20 to 23° C. and humidity of 45 to 60% RH. After capping, the PFA container is fixed to a rotational axis of a rotation device at a 30° angle of inclination, and is rotated at 120 rpm for 5 minutes. After opening the cap, the internal adsorbent is aspirated into a filter-capsule in an electrostatic charge measuring part, using a sampling nozzle of an apparatus for measuring electrostatic charge, and then the amount of charge is measured. After measuring the static charge, the weight of the filter capsule containing the internal adsorbent is measured, and a weight of the internal adsorbent is calculated by subtracting a tare weight of the filter capsule. Then, the charge amount (electrostatic charge amount; μC/g) per unit mass of the internal adsorbent is calculated. A mean value and standard deviation of the charge amount (electrostatic charge amount; μC/g) are calculated from 10 measured values.

Examples of the internal adsorbent include: the adsorbent for oral administration comprising a spherical activated carbon disclosed in Patent literatures 1 to 4, and the adsorbent for medicine disclosed in Patent literature 7.

For example, the adsorbent for oral administration comprises a porous spherical carbonaceous substance wherein: the diameter is 0.05 to 1 mm, the volume of voids having a pore radius of 80 angstrom or less, is 0.2 to 1.0 mL/g, and both of acidic groups and basic groups are contained. A preferable functional-groups constitution is that the total amount of acidic groups is 0.30 to 1.20 meq/g, the total amount of basic groups is 0.20 to 0.70 meq/g, and the ratio (A/B) of the total amount of acidic groups (A) to the total amount of basic groups (B) is 0.40 to 2.5.

The adsorbent for oral administration disclosed in Patent literature 2 comprises a spherical activated carbon prepared from a phenol resin or ion-exchange resin as a carbon source, wherein the diameter is 0.01 to 1 mm, the specific surface area determined by Langmuir's adsorption equation is 1000 m²/g or more, and the volume of pores having a diameter of 7.5 to 15000 nm is less than 0.25 mL/g.

Further, the adsorbent for oral administration disclosed in Patent literature 3 is mainly characterized by comprising a spheriClal activated carbon wherein the average particle diameter is 50 to 200 μm, and the specific surface area determined by the BET method is 700 m²/g or more. Furthermore, the adsorbent for oral administration disclosed in Patent literature 4 is mainly characterized by comprising a surface modified spheriClal activated carbon wherein the average particle diameter is 50 to 200 μm, the specific surface area determined by the BET method is 700 m²/g or more, the total amount of acidic groups is 0.30 meq/g to 1.20 meq/g, and the total amount of basic groups is 0.20 meq/g to 0.9 meq/g.

The packaging material used in the single-dose package of the present invention has a mean specific surface resistivity of $4.4 \times 10^9 \Omega$ or more to $1.0 \times 10^{16} \Omega$ or less at its internal surface. Packaging material having a lower mean specific surface resistivity at its internal surface has a good slip property. However, if the packaging material having less than $4.4 \times 10^9 \Omega$ of a mean specific surface resistivity at its internal surface is used, the internal adsorbent filled into the package bounces up and down, and attaches around the open region of the single-dose package. In this case, the internal adsorbent spills out on opening the package, and thus, the packaging material having a mean specific surface resistivity of less than $4.4 \times 10^9 \Omega$ at its internal surface is not preferable. Further, packaging material having more than $1.0 \times 10^{16} \Omega$ of a mean specific surface resistivity at its internal surface has a poor slip property, and thus the internal adsorbent attaches to the entire inside of the packaging material. Therefore, the spherical activated carbon is trapped in the heat-sealed region, and the internal adsorbent spills out on opening the package. Accordingly, packaging material having a mean specific surface resistivity of more than $1.0 \times 10^{16} \Omega$ at its internal surface is not preferable.

The mean specific surface resistivity at the internal surface is preferably $4.5 \times 10^9 \Omega$ or more to $7.5 \times 10^{15} \Omega$ or less, and is most preferably $5.2 \times 10^9 \Omega$ or more to $5.1 \times 10^{15} \Omega$ or less.

Figure 2:
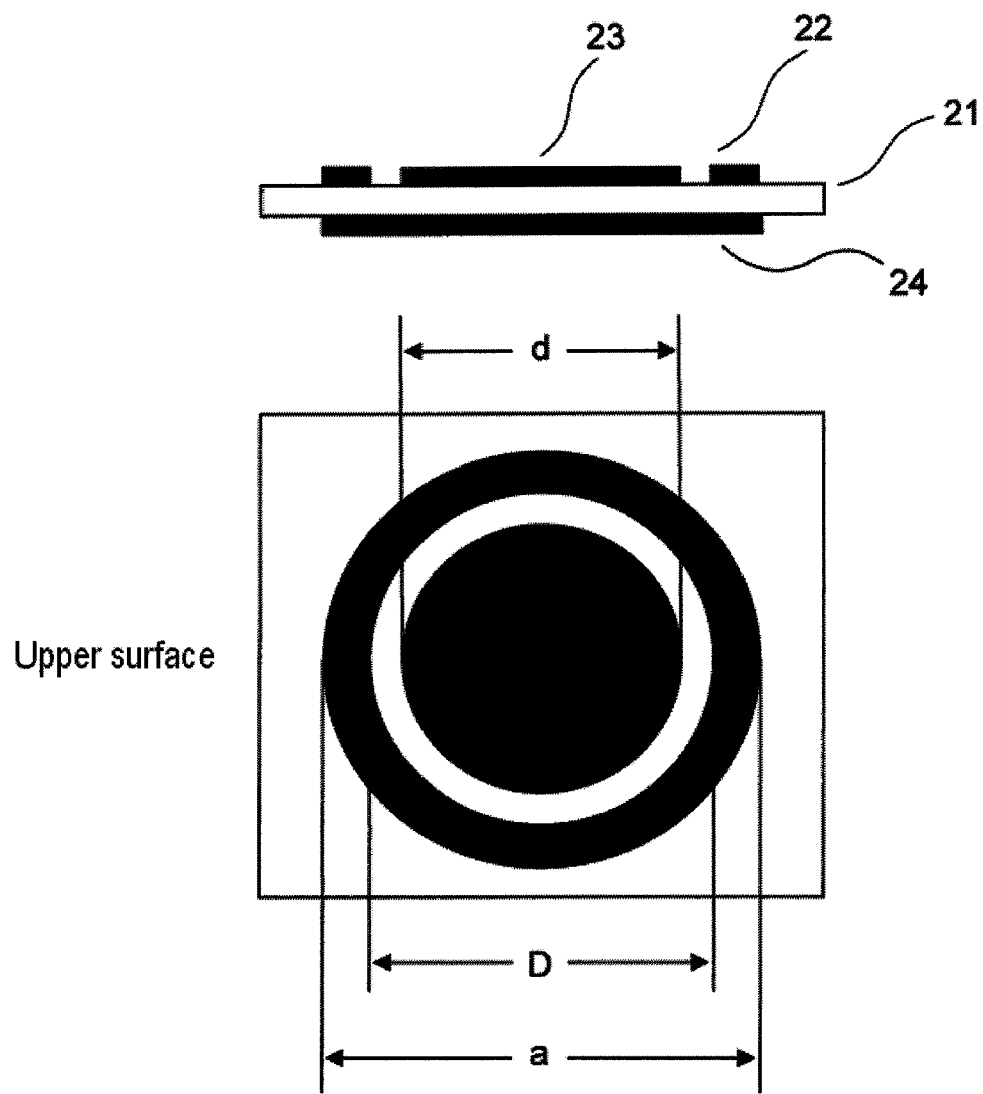
FIG. 2 is a view of an electrode of apparatus for measuring specific surface resistivity at the internal surface (apparatus for measuring surface resistivity).

In the present specification, the "mean specific surface resistivity at the internal surface" of the packaging material is measured in accordance with JIS K 6911 as follows. An apparatus for measuring a specific surface resistivity at the internal surface (apparatus for measuring the surface resistivity) according to a double ring electrode method (for example, super megohmmeter R-503 and measuring electrode P-616; Kawaguchi Electric Works Co., Ltd.) is used. FIG. 2 shows the packaging material and electrodes when the "mean specific surface resistivity at the internal surface" is measured. The packaging material is clipped by the rounded upper surface electrode and lower surface electrode. A voltage of 500 V is applied to the packaging material and then the resistance value is measured after one minute. The surface resistivity is calculated using the following formula. The mean specific surface resistivity at the internal surface is calculated from 3 measured values.

$$p = (\pi(D+d)/D-d) \times R$$

$$R = V/Is$$

p: surface resistivity (Ω)
D: inside diameter of the ring electrode (cm)
d: diameter of the inner circle of the upper surface electrode (cm)
R: surface resistance (Ω)
V: applied voltage (500V)
Is: current one minute after applying voltage (A)

The packaging material in not limited, as long as it has the above mean specific surface resistivity at the internal surface. It is possible to use a composite film (laminate film) or a single layer film as the packaging material. However, as the workability and the moisture-proof properties of composite films are superior, a composite film is preferable. In particular, a composite film having an outer layer, an intermediate layer, and an inner layer is preferable, a composite film having an intermediate layer including an aluminum layer is more preferable. For example, as one embodiment of the composite film, it may comprise
(1) an outer layer consisting of plastic film, cellophane, paper, or the like which has a high modulus of elasticity, and a good dimensional stability,
(2) an intermediate layer consisting of aluminum layer or the like which has a superior gas-barrier property and moisture-proof property,
(3) an inner layer consisting of sealant layer or the like which is capable being sealed by heat or ultrasonic waves.

Further, as a layer having both functions of the outer layer and the intermediate layer, there may be mentioned an aluminum-deposited layer, silica-deposited layer, or the like.

The packaging material may contain an antistatic agent in at least one of the outer layer, the intermediate layer, and the inner layer, in order to give to the mean specific surface resistivity at the internal surface of $4.4 \times 10^9 \Omega$ or more to $1.0 \times 10^{16} \Omega$ or less. The antistatic agent may be contained in an antistatic layer in the packaging material. Further, the antistatic agent can be applied to or kneaded into any layer composing the outer layer, intermediate layer, or inner layer. Preferably, the antistatic agent may be applied to or kneaded into any layer composing the inner layer which is in immediate contact with the internal adsorbent.

The antistatic agent is not limited, but examples include antistatic resin, (such as: cationic acrylic resin, etc. or resin containing conductive inorganic particle); alkyl quaternary ammonium salt; polyoxyethylene ether based antistatic agent (such as: polyoxyethylene sorbitan fatty acid ester); anionic antistatic agent; nonionic surfactant; fatty acid amine (such as: lauryl amine, myristyl amine, palmityl amine, stearyl amine, or oleyl amine); fatty acid glyceride (such as: fatty acid monoglyceride wherein the acyl group has 10 to 22 carbon atoms); or higher alcohol (for example, saturated or unsaturated aliphatic alcohol having 8 to 36 carbon atoms). Specifically, fatty acid amine, fatty acid glyceride or higher alcohol is preferable.

Regarding the outer layer, intermediate layer, and inner layer composing the packaging material, if the intermediate layer has a high modulus of elasticity, and good dimensional stability, the outer layer may be a plastic-coated layer. Further, a plastic film layer, plastic-coated layer, cellophane layer, paper layer, or the like can be contained between these layers. Further, the outer layer or the intermediate layer may not be contained therein, with the application thereof. The sealant layer may be formed on either the entire inner surface or a sealed region of the inner surface. Further, a sealant layer with a number of pores may be used. Furthermore, the packaging material for a single-dose package without a sealant layer can be prepared by using an adhesive agent. Examples of plastic used in a plastic film or plastic-coated layer, are: polyester (such as polyethylene terephthalate), polyvinylidene chloride, polyvinyl chloride, ethylene-vinyl alcohol copolymer, ethylene vinyl acetate copolymer, stretched polypropylene, polypropylene, stretched polyethylene, high density polyethylene, medium density polyethylene, linear low density polyethylene, low density polyethylene, ethylene-propylene copolymer, ethylene.butene copolymer, poly-butene-1, ionomer, ethylene-alkyl acrylate copolymers, ethylene-methacrylic acid copolymer, polychlorotrifluoroethylene, tefron, polyvinyl alcohol, polyacrylonitrile, acrylonitrile-butadiene-styrene copolymer, cellulose, polystyrene, polycarbonate, nylon (polyamide), or the like. In particular, polyester (such as polyethylene terephthalate), polyvinylidene chloride, various polyethylenes, or various polypropylenes are preferable. In the case of filling at high temperature, heat-resistant polymer is preferable. Examples of the heat-resistant polymer are: hydroxybenzoic acid polyester, polypropylene, poly-4-methylpenten-1, polyester (such as polyethylene terephthalate), polycarbonate, polyetherimide, polyarylate, or the like.

Examples of paper are glassine, opaque glassine, cormorant (Fuji kako k.k.), cellophane, brown paper, high-quality paper, simili paper, parchment paper, or the like, and specifically, glassine, opaque glassine, cormorant (Fuji kako k.k.), or cellophane are preferable. Examples of the intermediate layer which has a superior gas barrier property and moisture-proof property, are aluminum layers such as an aluminum foil or an aluminum-deposited layer or the like, a polychlorotrifluoroethylene layer, a polyvinylidene chloride layer, a polyvinylidene chloride copolymer layer, an ethylene-vinylalcohol copolymer layer, a silica-deposited layer, an alumina-deposited layer, or the like. In particular, an aluminum layer, a polychlorotrifluoroethylene layer, a polyvinylidene chloride layer, or an ethylene-vinylalcohol copolymer layer is preferable, and an aluminum layer is more preferable. Examples of sealant layers are various olefin polymers, olefin copolymer, polyvinyl acetate, vinyl chloride-vinyl acetate copolymer, polyvinylidene chloride, ethylene-acrylic alkylate copolymer, polybutadiene, polyester (such as polyethylene terephthalate), or copolyester based polymer, or the like. In particular, polyvinylidene chloride, various polyethylenes, or ethylene-acrylic alkylate copolymer are preferable. Further, in the case of filling at high temperature, heat-resistant polymer is preferable. Examples of the heat-resistant polymer are: hydroxybenzoic acid polyester, polypropylene, poly-4-methylpenten-1, polyester (such as polyethylene terephthalate), polycarbonate, polyetherimide, polyarylate, or the like. In particular, hydroxybenzoic acid polyester, or polyetherimide are preferable.

As the packaging material including an aluminum layer, the most preferable embodiment is as follows.
Outer layer: glassine, opaque glassine, cormorant (Fuji kako k.k.), cellophane, polyester (such as polyethylene terephthalate), nylon, polyethylene, high-quality paper, or heat-resistant polymer
Intermediate layer: aluminum layer (aluminum foil or aluminum-deposited layer)
Inner layer: polyvinylidene chloride, polyethylene, ethylene-alkyl acrylate copolymers, or heat-resistant polymer If necessary, the ethylene-vinyl acetate copolymer layer or polyethylene layer or the like can be formed as an adhesion layer inter each layer. Further, the composition of each layer per se is not limited to one material, and thus each layer can be prepared by combining two or more materials.

As described in Examples, the particular composite film includes:
(a) a composite film consisting of, in order from outside to inside: the outer layer consisting of an about 16 μm thick polyethylene terephthalate layer, and an about 15 μm thick polyethylene layer; the intermediate layer consisting of an about 9 μm thick aluminum layer; and the inner layer consisting of an about 15 μm thick polyethylene layer and an about 30 μm thick polyethylene layer containing an antistatic agent; and (b) a composite film consisting of, in order from outside to inside: the outer layer consisting of an about 16 μm thick polyethylene terephthalate layer, and an about 15 μm thick polyethylene layer; the intermediate layer consisting of an about 9 μm thick aluminum layer; and the inner layer consisting of an about 15 μm thick polyethylene layer and an about 3 μm thick polyvinylidene chloride layer. The mean specific surface resistivity at the internal surface of the composite films (a) and (b) are $5.1 \times 10^{15} \Omega$, and $5.2 \times 10^{9} \Omega$, respectively.

In the present specification, the scope of numerical values with "about" is ±10%.

The single-dose package of the present invention, can be prepared by a method wherein an internal adsorbent is tight-packed using the packaging material, under warming and/or reduced pressure. As methods for tight-packing under warming (A) or reduced pressure (B), the following methods can be used.

(A) The internal adsorbent having temperature of 5° C. higher than room temperature to 300° C. is filled into the single-dose packaging material, and then the single-dose packaging material is sealed. Alternatively, the internal adsorbent is filled into the single-dose packaging material, and then the single-dose packaging material and the internal adsorbent are warmed to a temperature of 5° C. higher than room temperature to 300° C. or less, and then the single-dose packaging material is sealed. The temperature is preferably a temperature of at least 10° C. higher than room temperature, and more preferably a temperature of at least 15° C. higher than room temperature. The temperature is preferably a temperature of 200° C. or less, and more preferably a temperature of 130° C. or less.

(B) The internal adsorbent is filled to the single-dose packaging material, and then the single-dose packaging material is sealed under a pressure less than atmospheric pressure.

Further, the method under warming (A) and the method under reduced pressure (B) can be carried out together. For example, the internal adsorbent having temperature higher than room temperature to 300° C. or less is filled to the single-dose packaging material pouch, and then the single-dose package is sealed under a pressure less than atmospheric pressure. In this case, as the two methods are carried out together, the temperature of the internal adsorbent on filling may be less than a temperature 5° C. higher than room temperature.

In the present specification, the room temperature means a temperature in the area for filling. That is, the range of the room temperature is 1° C. or more to 30° C. or less, as defined in the Japanese Pharmacopoeia. The wording "internal adsorbent having temperature of 5° C. higher than room temperature to 300° C." on filling as used herein means, for example, that if the room temperature in the area for filling is 15° C., a temperature of the internal adsorbent is 20° C. or more to 300° C. or less; and if the room temperature in the area for filling is 30° C., a temperature of the internal adsorbent is 35° C. or more to 300° C. or less. If the temperature of the internal adsorbent is less than the temperature 5° C. higher than room temperature, the internal adsorbent can be free in the single-dose package. Further, the volume of air adsorbed in the internal adsorbent varies by the change of temperature of outside, and therefore the volume of the single-dose package also varies greatly. In contrast, if the temperature of the internal adsorbent on filling is a temperature of 5° C. higher than room temperature to 300° C., the internal adsorbent adsorbs air in the single-dose package in the course of lowering of temperature to room temperature, after sealing. Therefore, the pressure in the single-dose package is reduced, and then the single-dose package rapidly becomes reduced in size. As a result, a vacuum is maintained in the single-dose package, and the internal adsorbent therein is not free. The volume of the resulting single-dose package does not vary due to a temperature change around room temperature. However, if the temperature of the internal adsorbent on filling is more than 300° C., the appearance of the single-dose package is not good, due to a softening of the inner layer of the single-dose package. Filling at a temperature of 5° C. higher than above room temperature to 300° C. or less is appropriate for a short storage of up to a few months. For a long-term storage of the single-dose package, a temperature of 30° C. or more to 300° C. or less is preferable, and a temperature of 35° C. or more to 200° C. or less is more preferable, and a temperature of 40° C. or more to 130° C. or less is further preferable.

The size and shape of the single-dose package is not particularly limited, but a shape having a width of 1 to 6 cm, and a length of 6 cm or more to 15 cm or less is preferable. For example, in the case of the adsorbent for oral administration for renal disease patient, the above shape is appropriate to fill with about 1 g or more to 4 g or less of the internal adsorbent as one dose.

EXAMPLES

The present invention now will be further illustrated by, but is by no means limited to, the following Examples.

In the Examples, the mean specific surface resistivity of the packaging material and the surface electric charge property are measured by the following methods.

(1) Mean Specific Surface Resistivity at the Internal Surface

The mean specific surface resistivity at the internal surface was measured in accordance with JIS K 6911. As an apparatus for measuring specific surface resistivity at the internal surface, a super megohmmeter R-503 and an electrode for measuring P-616 (Kawaguchi Electric Works Co., Ltd.) were used. The packaging material (100 mm×100 mm) was clipped between an upper surface electrode and an lower surface electrode so that the inner surface of the packaging material was in contact with the upper surface electrode. The dimensions of the upper surface electrode, as defined in FIG. 2, are: "a" is 80±0.5 mm, "D" is 70±0.5 mm, and "d" is 50±0.5 mm. The diameter of the lower surface electrode, "A" is 83±2 mm. A voltage of 500 V was applied to the positive electrode and the negative electrode of the lower surface electrode, and then resistance value was measured after one minute. The surface resistivity (Ω) is calculated using the following formula. The mean specific surface resistivity in internal surface is calculated from 3 measured values. The three measurements (three samples in one lot of the packaging material) were made repeatedly, and the mean of the three resulting values was calculated as the mean specific surface resistivity in internal surface.

$$\rho = (\pi(D+d)/D-d) \times R$$

$$R = V/Is$$

ρ: surface resistivity (Ω)
D: inside diameter of ring electrode (cm)
d: diameter of inner circle of upper surface electrode (cm)
R: surface resistance (Ω)
V: applied voltage (500V)
Is: current after one minute from applying voltage (A)

(2) Surface Electrostatic Charge Property

The amount of electrostatic charge was measured under the following conditions. The measurement was repeated ten times, and mean value and standard deviation were calculated from the ten resulting measurement values. The resulting mean was regarded as the amount of electrostatic charge.

(i) Measurement Environment

Temperature was 20 to 23° C., and relative humidity was 45 to 60%.

(ii) Container for Measurement 60 mL volume of a cylindrical PFA (perfluoroalkoxyalkane resin) container (AS ONE corporation, PFA resin container, PF-60) was used. External diameter of lid is approximately 60 mm. External diameter of body is approximately 53 mm. Height is approximately 44 mm. Internal diameter is approximately 48 mm. Internal height is approximately 36 mm. All the above dimensions are measured on the body with lid. An aluminum foil tape was affixed to an outside of the body and lid.

(iii) Treatment of Internal Surface of Container before Use

Before a different kind of sample was measured, the container was washed carefully using a detergent, and then dried completely. Contaminants in the container were removed by wiping with isopropanol before use, and any electrostatic charge in the container was completely removed using a blower for removal of electrostatic charge (MIDORI CT&ESD MI200S).

When same kind of sample was measured repeatedly, contaminants in the container were removed by wiping with isopropanol before use, and electrostatic charge in the container was completely removed using a blower for removal of electrostatic charge (MIDORI CT&ESD MI200S). The five containers for measurement were prepared. The containers were labelled and used.

(iv) Method for Measurement

Figure 4:
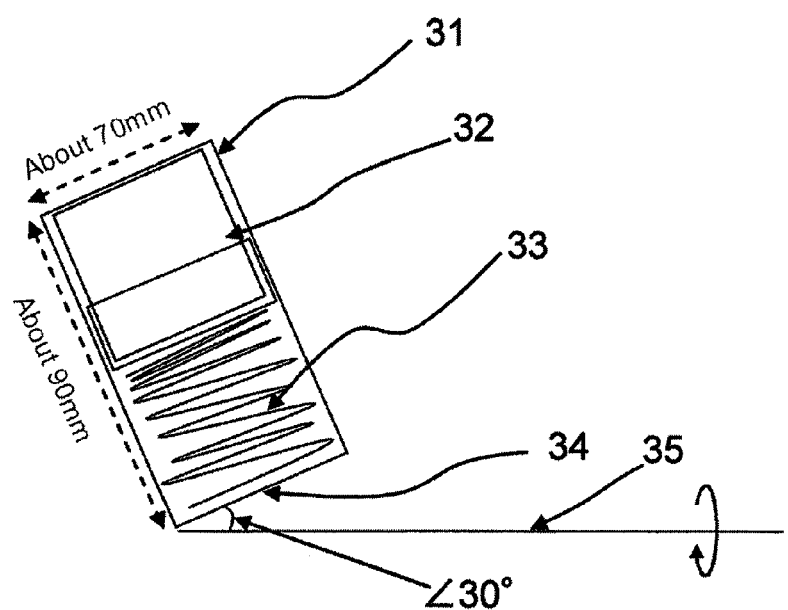
FIG. 4 is a view of the angle of inclination between the rotational axis of a rotation device and a container holder including a sample container when measuring the surface electric charge property.

About 0.1 g of internal adsorbent was put in the PFA container and the lid was closed. The container was set in a container holder (about 70 mm of diameter and about 90 mm of height) with sponge packing at the internal surface. The container holder was fixed to a rotational axis of rotation device at a 30° angle of inclination. The internal adsorbent charged by rotating at 120 rpm for 5 minutes (FIG. 4). After finishing the rotation, the lid of PFA container was opened. The internal adsorbent was aspirated into a filter-capsule in an electrostatic charge measuring part, using the sampling nozzle of an apparatus for measuring Faraday-cage Meter Unit EA02 (U-TEC corporation). The weight of the filter-capsule was measured before measurement of electrostatic charge, whereby a tare weight of the filter-capsule was obtained. After completing the measurement of the charge amount, the filter-capsule was ejected. The weight of the internal adsorbent was calculated by measuring the weight of the filter-capsule containing the internal adsorbent and subtracting the tare weight of the filter-capsule. Then, the amount of charge per unit mass of the internal adsorbent was calculated (electrostatic charge amount; $\mu C/g$). The measurement was repeated ten times, and the mean value and standard deviation of the ten resulting values were calculated.

Manufacturing Example 1

Preparation of Porous Spherical Carbonaceous Substance

The porous spherical carbonaceous substance was obtained by a method similar to the method described in Example 1 of Japanese Patent No. 3522708 (Japanese Unexamined Patent Publication (Kokai) No. 2002-308785). The specific procedure was as follows.

Petroleum pitch (68 kg) (softening point=210° C.; quinoline insoluble contents=not more than 1% by weight; ratio of hydrogen atoms/carbon atoms=0.63) and naphthalene (32 kg) were put into an autoclave (internal volume=300 L) equipped with stirring fans, melted at 180° C., and mixed. The mixture was extruded at 80 to 90° C. to form string-like shaped products. Then, the string-like shaped products were broken so that a ratio of diameter to length became about 1 to 2.

The resulting broken products were added to an aqueous solution prepared by dissolving 0.23% by weight of polyvinyl alcohol (saponification value=88%) and heating to 93° C., and dispersed by stirring to be spheroidized. Then, the whole was cooled by replacing the polyvinyl alcohol aqueous solution with water, at 20° C. and left for 3 hours, whereby the pitch was solidified and naphthalene crystals were precipitated, and a slurry of spherical-shaped products of pitch was obtained.

After most of the water was removed by filtration, the naphthalene in the pitch was extracted and removed with n-hexane at an amount of about 6 times that of the spherical shaped products of pitch. The resulting porous spherical pitch was heated to 235° C. by passing of heated air in a fluidized bed, and allowed to stand at 235° C. for 1 hour, to be oxidized, and a porous spherical oxidized pitch was obtained, which is not fusible by heat.

Thereafter, the resulting porous spherical oxidized pitch was activated in a fluidized bed at 900° C. for 170 minutes using a nitrogen gas atmosphere containing 50% by volume of steam to obtain a spherical activated carbon. Further, the resulting spherical activated carbon was oxidized in the fluidized bed at 470° C. for 195 minutes using a nitrogen-oxygen atmosphere containing 18.5% by volume of oxygen, and reduced in the fluidized bed at 900° C. for 17 minutes using a nitrogen gas atmosphere, to obtain a porous spherical carbonaceous substance.

The properties of the resulting surface-modified spherical activated carbon are as follows.

Specific surface area=1300 $m^2/g$ (BET method);
Volume of pores=0.08 mL/g
(Volume of pores having a diameter of 20 to 15000 nm determined by a mercury press-injection method);
Average particle diameter=350 $\mu m$;
Total amount of acidic groups=0.67 meq/g; and
Total amount of basic groups=0.54 meq/g.

Manufacturing Example 2

Preparation of Porous Spherical Carbonaceous Substance

The porous spherical carbonaceous substance (surface-modified spherical activated carbon) was obtained by a method similar to the method described in Example 1 of Japanese Unexamined Patent Publication (Kokai) No. 2005-314416). The specific procedure was as follows.

Deionized water (220 g) and methyl cellulose (58 g) were put into a 1 L separable flask. 105 g of styrene, 184 g of divinyl benzene with a purity of 57% (57% divinylbenzene and 43% ethylvinyl benzene), 1.68 g of 2,2'-azobis(2,4-dimethylvaleronitrile), and 63 g of 1-butanol as a porogen were added thereto. Then, the atmosphere was replaced with a nitrogen gas. The two-phase system was stirred at 200 rpm, and heated to 55° C., and then allowed to stand for 20 hours. The resulting resin was filtered, and dried in a rotary evaporator. In a vacuum dryer, 1-butanol was removed from the resin by distillation, and the product was dried under a reduced pressure at 90° C. for 12 hours to obtain a spherical porous synthetic resin having an average particle diameter of 180 μm. A specific surface area of the porous synthetic resin was about 90 m²/g.

The resulting spherical porous synthetic resin (100 g) was put into a reactor, which had a grating, and treated to impart infusibility in a vertical tubular furnace. The infusibility-imparting treatment was carried out under the conditions that dried air (3 L/min) was upwardly passed from the lower portion of the reactor tube, the temperature was raised to 260° C. at a rate of 5° C./h, and the whole was allowed to stand at 260° C. for 4 hours to obtain a spherical porous oxidized resin. The resulting spherical porous oxidized resin was heat-treated at 600° C. for 1 hour under a nitrogen atmosphere, and then activated in a fluidized bed at 820° C. for 10 hours under a nitrogen gas atmosphere containing 64.5% by volume of steam, to obtain a spherical activated carbon.

The resulting spherical activated carbon was oxidized in the fluidized bed at 470° C. for 195 minutes under a nitrogen-oxygen atmosphere containing 18.5% by volume of oxygen, and reduced in the fluidized bed at 900° C. for 17 minutes under a nitrogen gas atmosphere, to obtain a surface-modified spherical activated carbon. The properties of the resulting surface-modified spherical activated carbon are as follows.
Specific surface area=1763 m²/g (BET method);
Volume of pores=0.05 mL/g
(Volume of pores having a diameter of 20 to 15000 nm determined by a mercury press-injection method);
Average particle diameter=111 μm (Dv50);
Total amount of acidic groups=0.59 meq/g; and
Total amount of basic groups=0.61 meq/g.
<<Measurement of Surface Electric Charge Property>>

Figure 3:
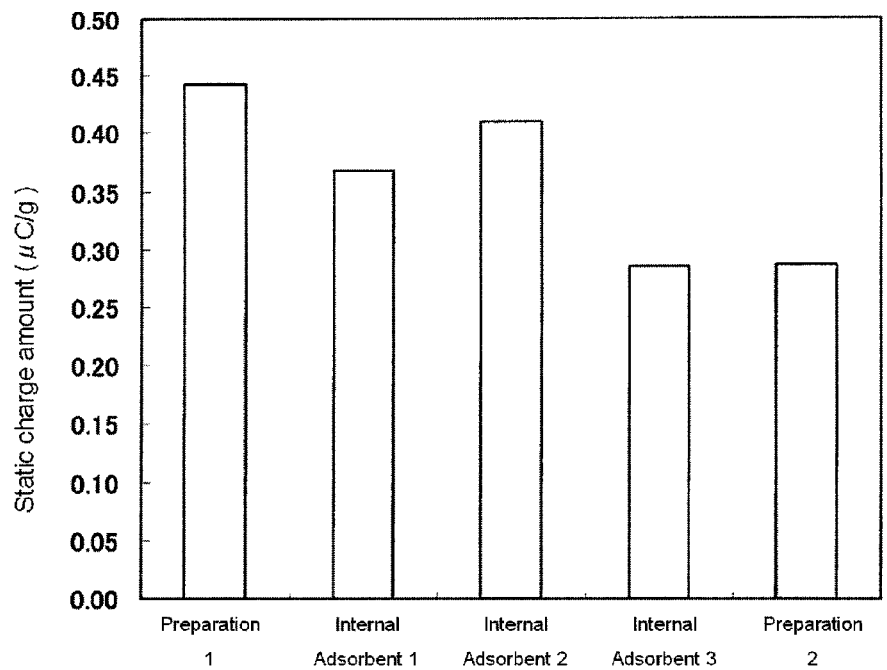
FIG. 3 is a graph showing the surface electric charge property of a spherical activated carbon prepared in Manufacturing Examples 1 and 2, and a commercially available internal adsorbent.

The surface electric charge properties of the spherical activated carbons obtained in the Manufacturing Examples 1 and 2, and commercially available internal adsorbents 1, 2, and 3, were measured in accordance with the method described above. The results are shown in FIG. 3.

The amount of static charge of the spherical activated carbon obtained in the Manufacturing Example 1 was 0.442 μC/g, and the standard deviation was 0.017 μC/g. The amount of electrostatic charge of the spherical activated carbon obtained in the Manufacturing Example 2 was 0.286 μC/g, and the standard deviation was 0.021 μC/g. The amount of electrostatic charge of the internal adsorbent 1 was 0.368 μC/g, and the standard deviation was 0.113 μC/g. The amount of electrostatic charge of the internal adsorbent 2 was 0.409 μC/g, and the standard deviation was 0.051 μC/g. The amount of electrostatic charge of the internal adsorbent 3 was 0.285 μC/g, and the standard deviation was 0.060 μC/g. These results were all in the range 0.028 or more to 0.707 μC/g or less.

Example 1

An single-dose package was prepared using the spherical activated carbon obtained in the Manufacturing Example 1 and a composite packaging material 1. The packaging material constitution is as follows. It is described from the outer surface of the packaging material.
polyethylene terephthalate layer (about 16 μm)/polyethylene layer (about 15 μm)/aluminum layer (about 9 μm)/polyethylene layer (about 15 μm)/polyethylene layer (about 30 μm)

The mean specific surface resistivity at the internal surface of the composite packaging material was measured in accordance with the method described above.

The spherical carbon was filled into the composite packaging material and packed using a three lane stick packaging machine (IWAKURO Mfg. CO. LTD) under the conditions that the filling rate was 50 shot per minute, the fill ration of the spherical activated carbon (adsorbent carbon) was 2 g, and the stick had a width of 3 cm and a length of 9 cm. Specifically, 2 g of the spherical activated carbon, which was warmed to 60 to 80° C., was filled into a stick-type packaging bag, and the packaging bag was sealed by heat. The prepared stick-type single-dose product was allowed to stand upside down and cooled to room temperature so as to obtain the stick-type single-dose package.

The obtained stick-type single-dose packages were examined for the numbers of spherical activated carbon trapped in the heat-sealed region and the numbers of the activated carbon attached around the open region. Specifically, with respect to 100 single-dose packages, the particle numbers of spherical activated carbon trapped in a heat-sealed region (11 in FIG. 1), and the particle numbers of spherical activated carbon on the upper portion of the open region (12 in FIG. 1), and the lower portion of the open region (13 in FIG. 1) were counted by the naked eye, and the mean value over 100 single-dose packages was calculated. The results are evaluated in accordance with the evaluation criteria stated in Table 1.

TABLE 1

| Region | Evaluation (particle numbers of spherical activated carbon) | | |
|---|---|---|---|
| | ○ (Good) | Δ (Fair) | X (Poor) |
| Heat-sealed region (11) | 2 or less | — | 3 or more |
| Upper portion of open region (12) | 2 or less | 3 to 4 | 5 or more |
| Lower portion of open region (13) | 29 or less | 30 to 49 | 50 or more |

The results are shown in Table 2.

Example 2

The procedure of Example 1 was repeated, except that the composite packaging material 2 consisting of polyethylene terephthalate layer (about 16 μm)/polyethylene layer (about 15 μm)/aluminum layer (about 9 μm)/polyethylene layer (about 15 μm)/polyvinylidene chloride layer (about 3 μm) was used, instead of the composite packaging material 1. The results are shown in Table 2.

Comparative Example 1

The procedure of Example 1 was repeated, except that the composite packaging material 3 consisting of polyethylene terephthalate layer (about 12 μm)/dry adhesive/aluminum layer (about 9 μm)/dry adhesive/uncharged polyethylene layer (about 40 μm) was used, instead of the composite packaging material 1. The results are shown in Table 2.

Comparative Example 2

The procedure of Example 1 was repeated, except that the composite packaging material 4 consisting of polyethylene terephthalate layer (about 16 μm)/polyethylene layer (about 15 μm)/aluminum layer (about 9 μm)/polyethylene layer (about 15 μm)/polyethylene layer (about 30 μm) was used, instead of the composite packaging material 1. The results are shown in Table 2.

TABLE 2

| | Specific surface resistivity ($\Omega$) | | Evaluation in each region (particle number; mean in 100 single-dose packages) | | |
|---|---|---|---|---|---|
| | Each Measured value | Average | Heat-sealed region (11) | Upper portion of open region (12) | Lower portion of open region (13) |
| Example 1 | $5.0 \times 10^{14}$ $1.0 \times 10^{16}$ $5.0 \times 10^{15}$ | $5.1 \times 10^{15}$ | ○ (0) | ○ (0) | ○ (22) |
| Example 2 | $5.9 \times 10^{9}$ $4.3 \times 10^{9}$ $5.4 \times 10^{9}$ | $5.2 \times 10^{9}$ | ○ (0) | ○ (0) | ○ (15) |
| Comparative Example 1 | $4.4 \times 10^{9}$ $3.9 \times 10^{9}$ $3.1 \times 10^{9}$ | $3.8 \times 10^{9}$ | ○ (0) | ○ (0) | Δ (48) |
| Comparative Example 2 | $1.0 \times 10^{16}<$ $1.0 \times 10^{16}<$ $1.0 \times 10^{16}<$ | $1.0 \times 10^{16}<$ | X (31) | X (23) | X (110) |

In the evaluation of the particle numbers in the heat-sealed region (11), upper portion of the open region (12), and lower portion of the open region (13), a packaging material having the evaluation of good (○) or satisfactory (Δ) is regarded as a good quality one. Thus the scope of the mean specific surface resistivity at its internal surface is $1.0 \times 10^{16} \Omega$ or less.

Further, a packaging material having the evaluation of good (○) is regarded as an ideal quality one. In connection with this, the lowest value in the three measured values of Example 2 is $4.3 \times 10^{9} \Omega$ and the highest value in the three measured values of Comparative Example 1 is $4.4 \times 10^{9} \Omega$. Thus, it is estimated that there exists a lower limiting point at around this value. As for the preferable lower limit of the mean specific surface resistivity at its internal surface, the value "$4.4 \times 10^{9} \Omega$" which is highest value in the three measured values of Comparative Example 1, is adopted as a preferable lower limit of the mean specific surface resistivity at the internal surface. As for the preferable upper limit of the mean specific surface resistivity at the internal surface, the highest value in the three measured values of Example 1 is $1.0 \times 10^{16} \Omega$ and the lowest value in the three measured values of Comparative Example 2 is more than $1.0 \times 10^{16} \Omega$. Therefore, the value $1.0 \times 10^{16} \Omega$ which is the highest value in the three measured values of Example 1, is adopted as the preferable higher limit of the mean specific surface resistivity at the internal surface.

INDUSTRIAL APPLICABILITY

In the single-dose package of the present invention, there is no internal adsorbent trapped in the heat-sealed region of the single-dose package. Further, the internal adsorbent is not present in the open region of the single-dose package, and thus the internal adsorbent hardly spills out on opening. The invasion of outside air into the single-dose package due to the trapped the internal adsorbent can be avoided, and thus, loss of quality of the internal adsorbent can be prevented. Furthermore, a spilling out of the internal adsorbent on opening can be prevented, and thus a handling on opening may be improved.

Although the present invention has been described with reference to specific embodiments, various changes and modifications obvious to those skilled in the art are possible without departing from the scope of the appended claims.

1 . . . single-dose package;
11 . . . heat-sealed region;
12 . . . upper portion of open region;
13 . . . lower portion of open region;
14 . . . portion with applied perforation for opening;
21 . . . packaging material (inner layer is placed on a upper surface electrode side);
22 . . . upper surface electrode (+);
23 . . . upper surface electrode (−)
24 . . . guard electrode;
31 . . . container holder;
32 . . . sample container (PFA container);
33 . . . cushioning such as sponge;
34 . . . surface for fixing to rotation device;
35 . . . rotational axis of rotation device.

The invention claimed is:

1. A single-dose package characterized in that a spherical activated carbon having a surface electric charge property of 0.225 μC/g or more and 0.409 μC/g or less, which is the electrostatic charge amount of the spherical activated carbon when the spherical activated carbon contained in a fluorocarbon resin container is rotated at 120 rpm for 5 minutes, is tight-packed using a packaging material having a mean specific surface resistivity of $5.2 \times 10^{9} \Omega$ or more to $5.1 \times 10^{15} \Omega$ or less at its internal surface, under warming and/or reduced pressure.

2. The single-dose package according to claim 1, wherein the packaging material is composed of, in order from outside to inside, an outer layer consisting of a polyethylene terephthalate layer and a polyethylene layer; an intermediate layer consisting of an aluminum layer; and an inner layer consisting of a polyethylene layer and a polyethylene layer containing antistatic agent.

3. The single-dose package according to claim 1, having a width of 1 cm or more to 6 cm or less, and a length of 6 cm or more to 15 cm or less.

4. The single-dose package according to claim 1, wherein the spherical activated carbon is an adsorbent for oral administration.

5. The single-dose packaging material according to claim 4, wherein the packaging material is a composite film comprising an outer layer, an intermediate layer, and an inner layer.

6. The single-dose package according to claim 1, wherein the packaging material is a composite film comprising an outer layer, an intermediate layer, and an inner layer.

7. The single-dose package according to claim 6, wherein the intermediate layer of the packaging material comprises an aluminum layer.

8. A method for preparing a single-dose package characterized in that a spherical activated carbon having a surface electric charge property of 0.225 μC/g or more and 0.409 μC/g or less, which is the electrostatic charge amount of the spherical activated carbon when the spherical activated carbon contained in a fluorocarbon resin container is rotated at 120 rpm for 5 minutes, is tight-packed using a packaging material having a mean specific surface resistivity of $5.2 \times 10^{9} \Omega$ or more to $5.1 \times 10^{15} \Omega$ or less at its internal surface, under warming condition and/or reduced pressure.

* * * * *